United States Patent
Manglani et al.

(10) Patent No.: US 12,182,613 B1
(45) Date of Patent: Dec. 31, 2024

(54) SYSTEMS AND METHODS FOR EXPORTING DESIGN DATA USING NEAR-OPTIMAL MULTI-THREADING SCHEME

(71) Applicant: CADENCE DESIGN SYSTEMS, INC., San Jose, CA (US)

(72) Inventors: Chandra Prakash Manglani, Uttar Pradesh (IN); Amit Khurana, Uttar Pradesh (IN); Sunil Prasad Todi, Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 703 days.

(21) Appl. No.: 17/245,506

(22) Filed: Apr. 30, 2021

(51) Int. Cl.
  *G06F 30/31* (2020.01)
  *G06F 3/06* (2006.01)
  *G06F 9/48* (2006.01)

(52) U.S. Cl.
  CPC .......... *G06F 9/4843* (2013.01); *G06F 3/0608* (2013.01); *G06F 3/0652* (2013.01); *G06F 3/0679* (2013.01); *G06F 30/31* (2020.01)

(58) Field of Classification Search
  USPC .................................................. 716/111, 112
  See application file for complete search history.

(56) References Cited

U.S. PATENT DOCUMENTS

| | | | | |
|---|---|---|---|---|
| 8,185,854 B1* | 5/2012 | Hutton | ................ | G06F 30/3312 716/108 |
| 8,286,125 B2* | 10/2012 | McDonald | ................ | G06F 8/38 716/139 |
| 8,510,685 B1* | 8/2013 | Rossman | ................ | G06F 30/39 716/54 |
| 8,539,416 B1* | 9/2013 | Rossman | .............. | G06F 30/398 716/124 |
| 8,723,651 B2* | 5/2014 | Kawaguchi | .......... | G06K 7/0008 340/10.4 |
| 9,246,776 B2* | 1/2016 | Ellsworth | .............. | H04L 47/782 |
| 10,796,042 B1* | 10/2020 | Singh | ....................... | G06F 30/30 |
| 2006/0033945 A1* | 2/2006 | McDonald | ................ | G06F 8/38 358/1.13 |
| 2009/0307640 A1* | 12/2009 | Chapman | ............ | G06F 30/3323 716/136 |
| 2012/0151431 A1* | 6/2012 | Huijbregts | ............ | G06F 30/392 716/131 |
| 2014/0310670 A1* | 10/2014 | Oberai | .................. | G06F 30/398 716/112 |

* cited by examiner

*Primary Examiner* — Brian Ngo
(74) *Attorney, Agent, or Firm* — Foley & Lardner LLP

(57) ABSTRACT

A system for generating a single design data file may include a processor and a memory. The processor may obtain design data including a plurality of design units. The processor may determine a first order of the plurality of design units. The processor may translate each of the plurality of design units into a corresponding file fragment by executing multiple threads of a first process. The processor may aggregate each of the plurality of file fragments into the single design data file in the first order by executing a second process in parallel to the first process.

20 Claims, 10 Drawing Sheets

| Benchmark | OA Data Size (MB) | Number of Cells | GDS Data Size (MB) | Number of Shapes (Million) |
|---|---|---|---|---|
| Customer 1 (C1) | 5000 | 16101 | 16948 | 151.87 |
| Customer 2 (C2) | 3560 | 74800 | 5903 | 56.92 |
| Customer 3 (C3) | 6123 | 241255 | 830 | 1.55 |

*Fig. 8A*

| Benchmark | Single thread scheme | | 2 Threads | | 4 Threads | | 8 Threads | |
|---|---|---|---|---|---|---|---|---|
| | Runtime (sec) | Peak VM (GB) | Runtime (sec) | Peak VM (GB) | Runtime (sec) | Peak VM (GB) | Runtime (sec) | Peak VM (GB) |
| C1 | 179.4 | 5.97 | 74.45 | 5.97 | 51.40 | 5.97 | 41.60 | 5.97 |
| C2 | 95.3 | 4.39 | 57.95 | 4.59 | 50.97 | 4.59 | 47.90 | 4.59 |
| C3 | 295.56 | 9.01 | 137.35 | 9.63 | 130.67 | 9.63 | 128.13 | 9.63 |

*Fig. 8B*

| Benchmark | GDS Data Size (MB) | Time to read OA (t1) (sec) | Time to CP (t3) (sec) | Lower Bound for Translation (t1 + t3) (sec) |
|---|---|---|---|---|
| C1 | 16948 | 17.97 | 18.77 | 36.74 |
| C2 | 5903 | 38.31 | 6.78 | 45.09 |
| C3 | 830 | 125.19 | 1.05 | 126.24 |

*Fig. 9A* — 900

| Benchmark | Single thread Solution | | 2 Threads | | 4 Threads | | 8 Threads | | Lower Bound for Translation (t1 + t3) (sec) |
|---|---|---|---|---|---|---|---|---|---|
| | Runtime (sec) | Peak VM (GB) | Runtime (sec) | Peak VM (GB) | Runtime (sec) | Peak VM (GB) | Runtime (sec) | Peak VM (GB) | |
| C1 | 179.4 | 5.97 | 74.45 | 5.97 | 51.40 | 5.97 | 41.60 | 5.97 | 36.74 |
| C2 | 95.3 | 4.39 | 57.95 | 4.59 | 50.97 | 4.59 | 47.90 | 4.59 | 45.09 |
| C3 | 295.56 | 9.01 | 137.35 | 9.63 | 130.67 | 9.63 | 128.13 | 9.63 | 126.24 |

*Fig. 9B* — 950

SYSTEMS AND METHODS FOR EXPORTING DESIGN DATA USING NEAR-OPTIMAL MULTI-THREADING SCHEME

TECHNICAL FIELD

This application is generally directed towards electronic design automation (EDA), and to systems, methods, devices, and instructions for exporting design data, and more specifically towards systems, methods, devices, and instructions for efficiently streaming design data by translating one design data format to another design data format using multi-processing, multi-threading, and memory-mapped disks.

BACKGROUND

Modern semiconductor based integrated circuits (ICs) are incredibly complex and contain millions of circuit devices, such as transistors, and millions of interconnections between the circuit devices. Designing such complex circuits cannot be accomplished manually, and circuit designers use computer based EDA tools for synthesis, debugging, and functional verification of an electronic system. The electronic system may include an IC or a printed circuit board (PCB). The IC may be a system-on-chip (SOC), application-specific integrated circuit (ASIC), or a field programmable gate array (FPGA).

An EDA system can store design data in a database system, of often in an industry standard format such as OpenAccess, which enables interoperability between design databases from different design software (e.g., EDA tool) suppliers. For example, OpenAccess can support design representations at full chip-level, block-level, and cell-level (e.g., group of transistor and interconnect structures that provides a Boolean logic function or a storage function). The basic unit of OpenAccess design data is Cellview, representing a design object or cluster in a design hierarchy.

Design databases often include hardware and software components configured to "stream out" (e.g., export, transmit) database changes to various client devices or client applications. In some cases, the design databases include application programming interfaces (APIs) or executables for streaming out database changes (e.g., XStream-Out). In some cases, an EDA system can stream out database changes in a particular design format, for example, a circuit layout stream file format such as Graphic Design System (GDS) format. GDS is a binary format for data exchange of IC layout artwork, representing planar geometric shapes, text labels, and other information about the layout.

An EDA system (and most operating system) can run simultaneous sub-tasks within a process, called threads. By running multiple threads within a single process (multi-threading), a system can mostly improve CPU utilization. Streaming out database changes is a balanced process in which time spent in I/O and CPU are almost same. There is a need for a multi-threading mechanism to improve performance of streaming out database changes in both I/O and CPU utilizations.

SUMMARY

Disclosed herein are systems and methods capable of addressing the above described shortcomings and may also provide any number of additional or alternative benefits and advantages. Embodiments described herein provide for systems and methods that efficiently stream design data by translating from one design data format to another design data format using multi-processing, multi-threading, and memory-mapped disks.

In an embodiment, a method of generating a design data file for an EDA system in which the method comprises obtaining, by a computer, design data including a plurality of design units; determining, by the computer, a first order of the plurality of design units; translating, by the computer, each of the plurality of design units into a corresponding file fragment by executing multiple threads of a first process; and aggregating, by the computer, each of the plurality of file fragments into the design data file in the first order by executing a second process in parallel to the first process.

In another embodiment, a system for generating a design data file in which the system comprises a memory comprising non-transitory machine-readable storage; and a processor configured to: obtain design data including a plurality of design units; determine a first order of the plurality of design units; translate each of the plurality of design units into a corresponding file fragment by executing multiple threads of a first process; store each file fragment into the memory; and aggregate each of the plurality of file fragments into the design data file in the first order by executing a second process in parallel to the first process.

In yet another embodiment, a non-transitory computer readable medium storing program instructions configured to be executed by one or more processors to: obtain design data including a plurality of design units; determine a first order of the plurality of design units; translate each of the plurality of design units into a corresponding file fragment by executing multiple threads of a first process; and aggregate each of the plurality of file fragments into the design data file in the first order by executing a second process in parallel to the first process.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the subject matter described herein.

FIGS. 8A-8B show results of performance comparison between different thread-based schemes of generating a design data file in an EDA system, according to some embodiments.

FIGS. 9A-9B show results of performance comparison between (1) runtimes of different thread-based schemes of generating a design data file in an EDA system and (2) optimal lower bound run times, according to some embodiments.

DETAILED DESCRIPTION

Figure 1:
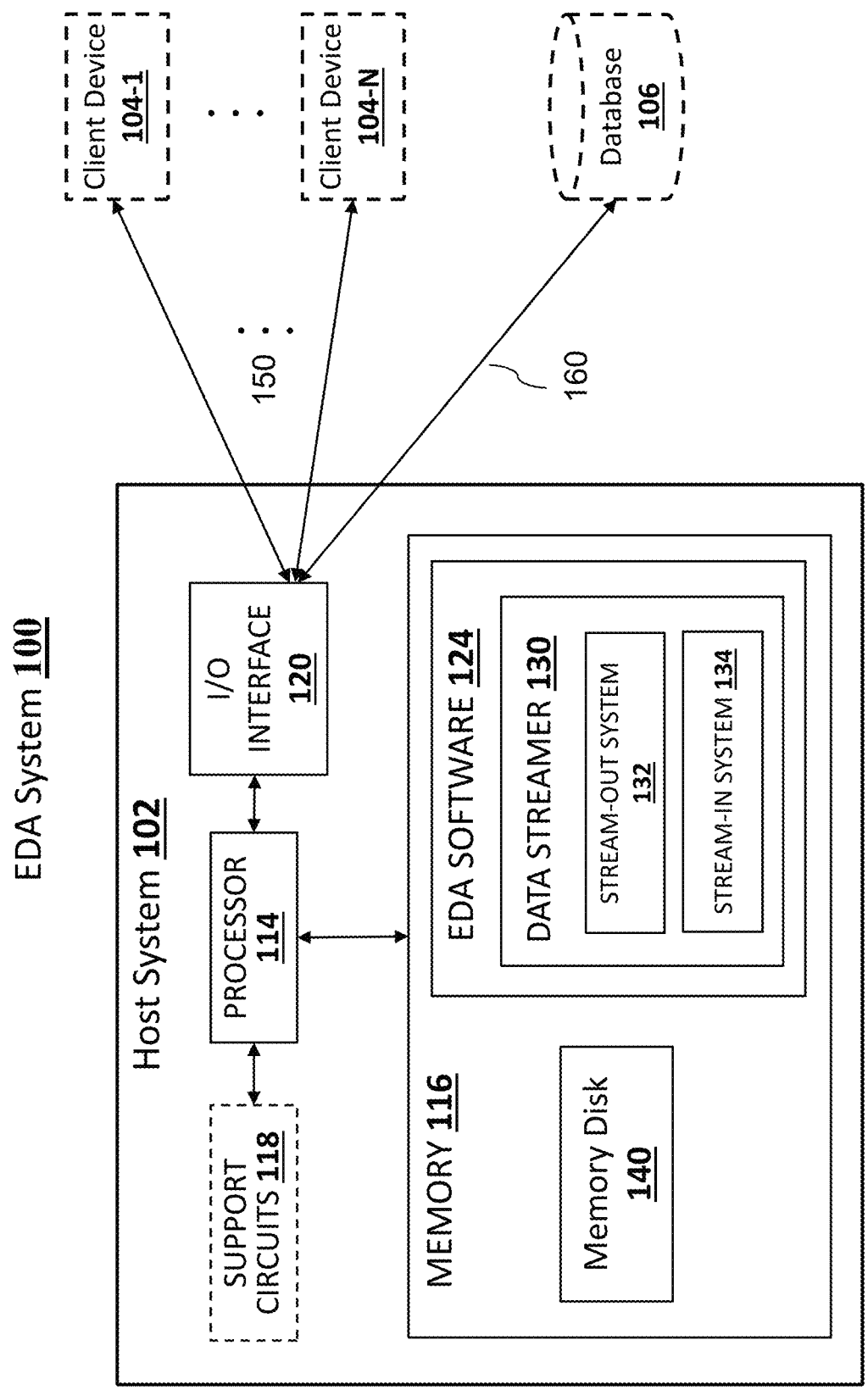
FIG. 1 is a block diagram depicting components of an EDA system, according to some embodiments.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments disclosed herein generally relate to data file management and translation of design layouts involving a database (e.g., OA database). Embodiments disclosed herein describe a system for generating a single design data file in which the system comprises a processor and a non-transitory machine-readable storage memory, including a hard drive disk (HDD), random access memory (RAM), a memory-mapped disk, and a RAM disk, among others. The processor may be configured to obtain design data including a plurality of design units. The processor may be configured to determine a first order of the plurality of design units. The processor may be configured to translate each of the plurality of design units into a corresponding file fragment by executing multiple threads of a first process. The processor may be configured to aggregate each of the plurality of file fragments into the single design data file in the first order by executing a second process in parallel to the first process. With this configuration, the system can (1) improve both I/O and CPU utilizations using multi-threading when an EDA system streams out design database changes to client devices by translating hierarchical design data (e.g., OpenAccess data) to a stream file (e.g., GDS file) with a deterministic order maintained in the stream file and/or (2) stream out design database changes to client devices in a scalable manner.

One problem relates to improving performance of an EDA system when the system streams out design database changes to client devices. Streaming out database changes is a balanced process in which time spent in I/O and CPU are almost same. For example, database stream-out processing may include: (1) reading design data (e.g., data in OpenAccess format) and opening the full hierarchy of design data; (2) translating shapes, labels, instances, vias, objects, etc. in the hierarchical design data into a design stream format (e.g., GDS format); (3) writing the design stream file (e.g., GDS file) on disk; and (4) post-processing all the collected statistics and results. Oftentimes, the step (1) is both I/O and CPU intensive; the steps (2) and (4) are CPU intensive; and the step (3) is I/O intensive. There is a need for improving performance of streaming out design database changes in both I/O and CPU utilizations.

Moreover, translating hierarchical design data (e.g., OpenAccess data) into design stream data (e.g., GDS file) includes several requirements or limitations. First, in some cases, the translated stream file (e.g., GDS file) must have a deterministic order to (1) enable easy ASCII dump comparison, (2) be able to determine whether two stream files are identical using a checksum value (e.g., Unix command 'cksum'), which would not be possible if order is different, and (3) help a stream-in task operation to effectively resolve cell dependencies in a design stream file (for example, a bottom-up STRUCT order dumped in a GDS file by a stream-out task would help a stream-in task to effectively resolve cell dependencies). Second, if multi-threading is used, the performance gain should scale well with increasing number of threads. Third, since layout needs to be exported for designs with large range of complexity and size, the memory required should scale well (non-exponentially) with problem size and number of threads. A multi-threading solution would typically require more memory than the corresponding single-threaded solution. Multi-threading can help in improving performance, but there is a need for a mechanism to address the above-mentioned requirements or limitations imposed by translation of hierarchical design data.

To solve these problems, according to certain aspects, embodiments in the present disclosure relate to techniques for improving both I/O and CPU utilizations when an EDA system streams out design database changes to client devices by translating hierarchical design data (e.g., OpenAccess data) to a stream file (e.g., GDS file) with a deterministic order maintained in the stream file.

According to certain aspects, an EDA system may use a multi-threaded process (translation process) that translates each object (or unit) in hierarchical design data (e.g., Cellview in OpenAccess) to separate, temporary stream file fragments (e.g., GDS file fragments). The temporary stream file fragments may be created or generated in a memory-mapped disk, such that temporary I/O operations on the temporary stream file fragment can be performed with memory-access characteristics, thereby improving I/O performance. A memory-mapped disk, available on Unix/Linux, can be used to write these temporary stream file fragments. The memory-mapped disk may be a RAM disk which can be used similar to normal disk (HDD). For example, the location a RAM disk may be '/dev/shm' on Linux. Moreover, the EDA system (e.g., host system 102 in FIG. 1) may use a separate process (stitch process) that stitches these separate temporary stream file fragments into a single stream file at a target location (e.g., a local disk in the EDA system). In this manner, the EDA system may (1) completely detach the design data translation task, which is CPU intensive, and the on-disk stream file writing task, which is I/O intensive, (2) execute both tasks in parallel across different processes, and (3) avoid a file handle related OS-level overhead.

According to certain aspects, an EDA system may create a main or parent process as a translation process that can execute CPU-intensive portions of the design data translation task using multi-threading. In each thread, a design object or unit (e.g., Cellview in OpenAccess) may be translated into a corresponding separate temporary stream file fragment (e.g., GDS file fragment) in a memory-mapped disk. In this manner, the threads do not have to wait for accessing a single stream file and can continuously translate the next available design object or unit without any wait. The temporary stream file fragments may have a sequence coded in their names, for example, an incrementing number included in the file names, which defines a deterministic order required in the final stream file. During translation, the file fragments may be named with a pre-defined suffix to identify that they are still being translated. For example, assuming the name of stream file format is "D2", the names of the file fragments may be "1.D2.part", "2.D2.part", . . . , etc., thereby preventing downstream processing from consuming a stream file fragment which is still being written. Once the design data translation completes, the file fragment may be renamed to a numbered stream file name, for example, "1.D2", "2.D2", . . . , etc.

The EDA system may create a child process as a stitch process that can execute I/O-intensive portions of the design data translation task, for example, the on-disk stream file writing task. Once a temporary stream file fragment is available in a memory-mapped disk, then the EDA system may cause the child process to pick or arrange stream file fragments in the order of a sequencing coded in their names (for example, an incrementing number) and to stitch (or aggregate, combine, assemble) the file fragments into a final stream file. A temporary stream file fragment may be deleted once it is stitched into the final stream file. A final stream file may be stored at a target location that is usually on a persistent storage device.

The stitch process can further handle a log file in a manner similar to the stream file (using temporary log file fragments) to ensure a deterministic order of log data pieces in the log file. The temporary log file fragments may also be used to communicate any error between the translation process and the stitch process, thereby helping to terminate the stitch process at an appropriate time and clean the rest of the temporary stream files and log files fragments in case of any error. For example, the stitch process may stitch the temporary stream file fragment and the corresponding temporary log file fragment for a design object or unit which is in the order. Then, it may look for the temporary stream file fragment and the corresponding temporary log file fragment of the next design object or unit. In some embodiments, a temporary stream file fragment and a corresponding temporary log file fragment are stitched in one iteration, not in two different dedicated iterations. The stitching process may execute in parallel to the translation step and may execute further in parallel to post-processing step, if stitching is still going on after translation of all the design objects or units. Additional optional operations can also be performed in post-processing step of translation process without any impact on overall runtime.

According to certain aspects, an EDA system may create a translation process so that the translation process executes a thread for translating each design object or unit in design data (e.g., each Cellview) in a multi-threaded fashion. Each thread may generate a separate temporary stream file fragment (e.g., GDS file fragment) and a separate log file fragment for the corresponding design object or unit, in a memory-mapped disk. The temporary stream file fragments may have increasing numbers in their names to encode a specific order. Similarly, the log file fragments may have increasing numbers in their names to encode a specific order. The EDA system may create a stitch process so that in parallel with the translation process, the stitch process can stitch the temporary stream file fragments in the defined specific order and generate a single stream file (e.g., GDS file) on a target location. The stitch process may execute an on-disk stream file writing task for all the object or unit in the design data (e.g., all Cellviews in OpenAccess data). The stitch process may also stitch available temporary log file fragments in the same order as encoded in their names, and generate a single log file. The stitch process may delete a temporary stream file fragment once it is stitched into the single stream file. Similarly, the stitch process may delete a log file fragment once it is stitched into the single log file.

According to certain aspects, a system for generating a single design data file may include a processor and a memory. The processor may be configured to obtain design data including a plurality of design units. The processor may be configured to determine a first order of the plurality of design units. The processor may be configured to translate each of the plurality of design units into a corresponding file fragment by executing multiple threads of a first process. The processor may be configured to aggregate each of the plurality of file fragments into the single design data file in the first order by executing a second process in parallel to the first process.

The design data may represent a hierarchy of the plurality of design units. The first order of the plurality of design units may be determined based on the hierarchy of the plurality of design units. The first order of the plurality of design units may be determined based on a post-order traversal of the hierarchy of the plurality of design units.

In translating each design unit, the processor may be configured to store the corresponding file fragment in a memory-mapped disk. In translating each design unit, the processor may be configured to execute a first thread of the multiple threads that translates a first portion of the plurality of design units into corresponding file fragments in an order consistent with the first order. The processor may be configured to execute, in parallel to the first thread, a second thread of the multiple threads that translates a second portion of the plurality of design units into corresponding file fragments in an order consistent with the first order.

The design file may have a data format different from a data format of the design data. Both the design data and the design file may have a binary data format and may have a hierarchical data format.

In aggregating each file fragment, the processor may be configured to read a corresponding file fragment from the memory-mapped disk. In aggregating each file fragment, the processor may be configured to determine that the entirety of the plurality of file fragments have been aggregated into the single design data file in the first order. In response to the determining, the processor may be configured to store the single design data file in a disk which is not a memory-mapped disk or a RAM disk. In aggregating file fragment, the processor may be configured to determine that a particular file fragment has been aggregated into the single data file. In response to the determining, the processor may be configured to delete the particular file fragment from the memory-mapped disk by executing the second process.

The processor may be further configured to obtain a plurality of log data pieces corresponding to the plurality of design units, store each of the plurality of log data pieces into a corresponding log file fragment in a memory-mapped disk by executing multiple threads of the first process, and aggregate each of the plurality of log file fragments into a single log file in the first order by executing the second process in parallel to the first process.

First, embodiments in the present disclosure can provide useful techniques for improving both I/O and CPU utilizations using multi-threading when an EDA system streams out design database changes to client devices by translating hierarchical design data (e.g., OpenAccess data) to a stream file (e.g., GDS file) with a deterministic order maintained in the stream file. An EDA system can create a stream file by generating stream file fragments at an object or unit level to achieve a maximum parallelism during a design object translation task (CPU intensive) in a multi-threaded fashion. The system can use multiple processes to manage an on-disk stream file writing task (I/O intensive) in a separate child process which allows the child process to execute in parallel to the design object translation task and also to a post-processing step of the design object translation task.

Second, embodiments in the present disclosure can provide useful techniques for using multi-threading to stream out design database changes to client devices in a scalable manner. For example, the multi-threading technique can be scalable with an increasing number of threads, and does not require a significant amount of additional memory as the number of threads increases.

FIG. 1 is a block diagram depicting components of an EDA system 100, according to some embodiments. The EDA system 100 includes a host system 102 communicatively coupled to a plurality of client devices 104-1, ..., 104-N via a communication link 150. In the present disclosure, an "EDA system" may refer to (1) a system including a host system and a client device (e.g., EDA system 100) or (2) a system communicatively coupled to a client device (e.g., host system 100). The host system 102 may be communicatively coupled to a database system 106 via a communication link 160. The database system 106 may store design data in an industry standard format such as OpenAccess. The communication link 150 includes any type of computing networking hardware and software components establishing a bus or link between the host system 102 and the client devices 104-1, ..., 104-N, and allowing for the transfer of data and control signals between the host system 102 and the client devices 104-1, ..., 104-N. Similarly, the communication link 160 includes any type of computing networking hardware and software components establishing a bus or link between the host system 102 and the database system 106, and allowing for the transfer of data and/or control signals between the host system 102 and the database system 106.

The host system 102 may be any computing device that includes a processor 114, a memory 116, various support circuits 118, and one or more I/O interfaces 120. A processor 114 of the host system 102 may include circuitry configured to execute the various processes and tasks described herein. Non-limiting examples of a processor 114 of the host system 102 may include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor.

Memory 116 of the host system 102 may store various forms of software and files, such as an operating system (OS) and EDA support software 124, such as a data streamer 130. Some of the commonly known memory 116 implementations may include, but are not limited to, RAM, a read only memory (ROM), an HDD, a secure digital (SD) card, a magneto-resistive read/write memory, an optical read/write memory, a cache memory, or a magnetic read/write memory. Memory 116 may include certain types of a memory that are employed for the stream out software processes described herein, including a memory-mapped disk 140. Although FIG. 1 illustrates a memory-mapped disk 140, it is intended that an alternative embodiment may be a RAM disk instead. A memory-mapped disk 140 can be used to write these temporary stream file fragments. The memory-mapped disk may be a RAM disk which can be used similar to normal disk (HDD). For example, the location a RAM disk may be '/dev/shm' on Linux. Support circuits 118 of the host system 102 may include conventional cache memory, power supply, clock circuits, data registers, I/O interfaces 120, and the like. An I/O interface 120 may be directly coupled to the memory 116 or coupled through the processor 114, and may be configured for communication with a client device 104-1, ..., or 104-N via the communication link 150 or communication with the database system 106 via the communication link 160. An I/O interface 120 may also be configured to receive inputs from user interface devices (e.g., keyboard, mouse) and to generate an interactive graphical user interface (GUI) to output on a monitor an interactive display configured to receive user inputs form the various interface devices.

The EDA software 124 may be a software module, which may be executed by the host system 102, and is configured to track the status and control the performed of components of the EDA system 100. The EDA software 124 may be configured to automate design and test processes of verifying the correctness of an electronic system (e.g., ICS or PCBs) against the specifications of the electronic system through various synthesis and verification steps. The EDA software 124 may be configured to test a manufactured electronic system to ensure that it meets the specifications and/or quality requirements of the electronic system.

The EDA software 124 may include a data streamer 130 that can be a component software module executed by the host system 102. The data streamer 130 may be configured to stream out changes in a database (e.g., database system 106 in FIG. 1) to client devices (e.g., client devices 104-1, ..., 104-N) via a stream-out system 132, or to gather data changes from an external data source and send them to a database (e.g., database system 106 in FIG. 1) via a stream-in system 134. In some embodiments, the stream-out system 132 and the stream-in system 134 may be implemented using APIs or executables for streaming out database changes (e.g., XStream-Out and XStream-In). Operations of the stream-out system 132 will be described with reference to FIG. 2.

Figure 2:
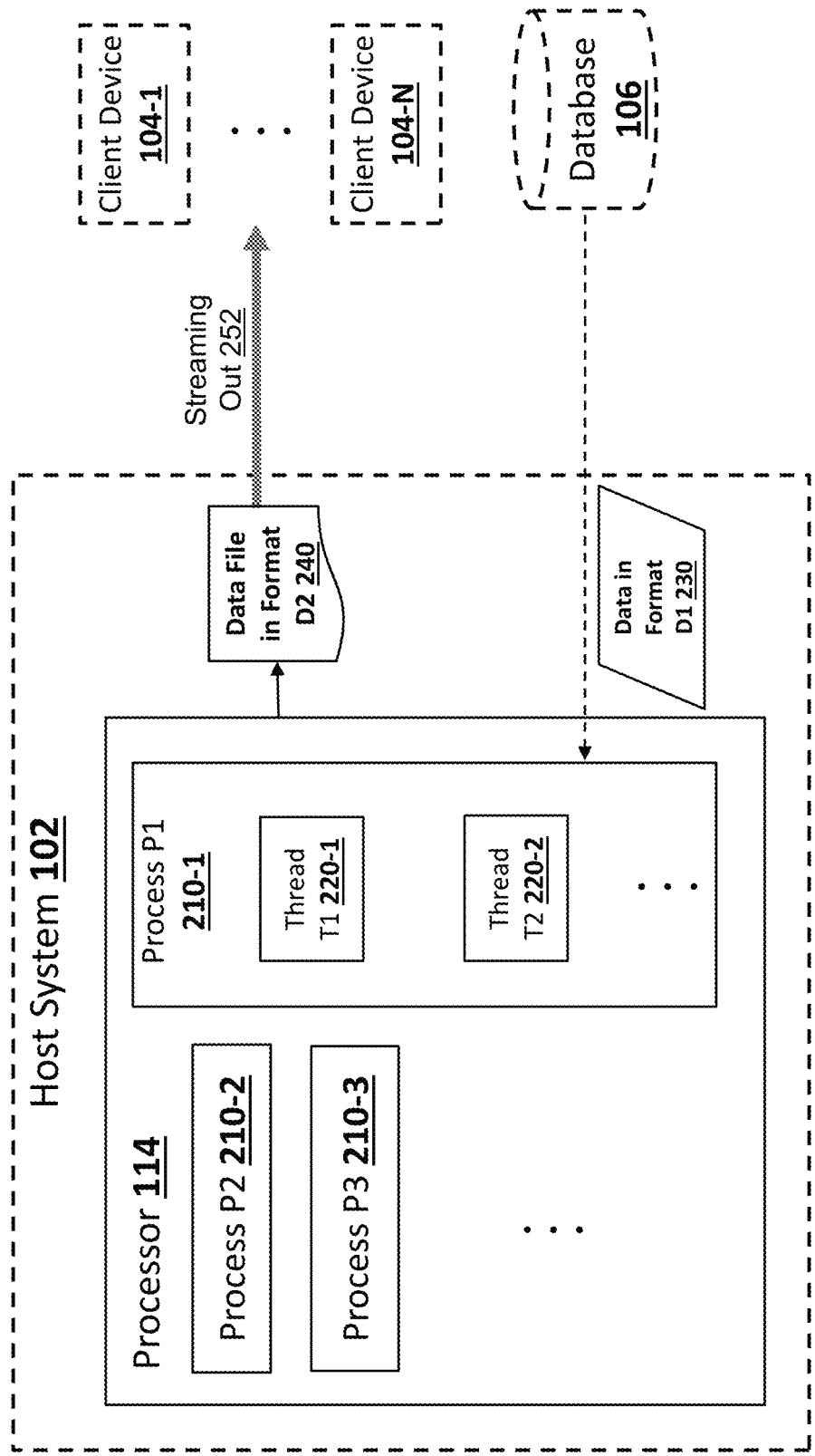
FIG. 2 is a block diagram showing operations of a stream-out system, according to some embodiments.

FIG. 2 is a block diagram showing operations of an example stream-out system, according to some embodiments. A stream-out system 132 (see FIG. 1) may be implemented using multi-threading as shown in FIG. 2. Referring to FIG. 2, among a plurality of processes P1 (210-1), P2 (210-2), P3 (210-3), the process P1 may execute multiple threads T1 (220-1), T2 (220-2), ..., etc. in parallel. Each of the multiple threads can obtain or access design data 230 in format D1 in a local disk (not shown) or from the database system 106, and translate or convert the design data 230 into a data file 240 in format D2 which is different from format D1. Once the multiple threads complete the translation or conversion, the stream-out system 132 (as shown in FIG. 1) may stream out the data file 240 to the client devices 104-1, ..., 104-N (as referred to streaming out 252 in FIG. 2). The format D1 of the design data 230 may be a hierarchical design data format that can represent design data at full chip-level, block-level, and cell-level. For example, the format D1 may be OpenAccess design data format. The format D2 of the data file 240 may be a layout stream file format for data exchange of IC layout artwork, representing planar geometric shapes, text labels, and other information about the layout. The format D2 may be a binary format. For example, the format D2 may be GDS format. Both the format D1 (design data) and the format D2 (design file) may have a binary data format and may have a hierarchical data format.

Figure 3A:
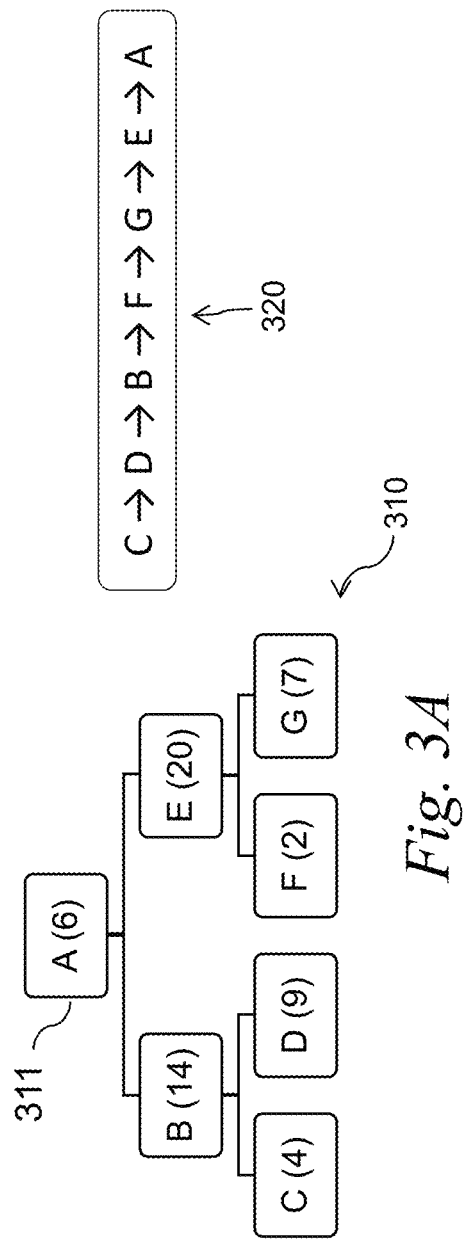
FIG. 3A is a block diagram showing hierarchical data.

Design data (e.g., design data 230 in FIG. 2) may be hierarchical data representing design objects or design units in a design hierarchy of multiple levels including full chip-level, block-level, and/or cell-level. For example, the basic unit of OpenAccess design data is Cellview representing a design object or cluster in a design hierarchy. FIG. 3A is a block diagram showing an example design hierarchy 310 in data format D1 (e.g., OpenAccess format; see FIG. 1), which is to be translated in data format D2 (e.g., GDS format; see FIG. 1) in a certain order. Each of nodes 311 (A, B, C, D, E, F, G) may represent a design object or a design unit (e.g., Cellview in OpenAccess data) in a design hierarchy of design data. Connecting lines between the nodes may represent hierarchies or dependencies between the nodes. The number indicated in the parenthesis in each node (e.g., A (6)) represents the time units requires to translate that node (e.g., Cellview in OpenAccess data) into data format D2 (e.g., GDS format). As shown in FIG. 3A, sequential translation of all the nodes A, B, C, D, E, F, G will take 62 time units.

Before performing translation of design data (e.g., data 230 in FIG. 2) into a stream data file (e.g., data file 240 in FIG. 2), the stream-out system 132 (as shown in FIG. 1) may determine an order of design objects or design units in the design data. Referring to FIG. 3A, the stream-out system may determine an order of design objects based on a post-order traversal of the design hierarchy (e.g., order 320 (C→D→B→F→G→E→A)).

Figure 3B:
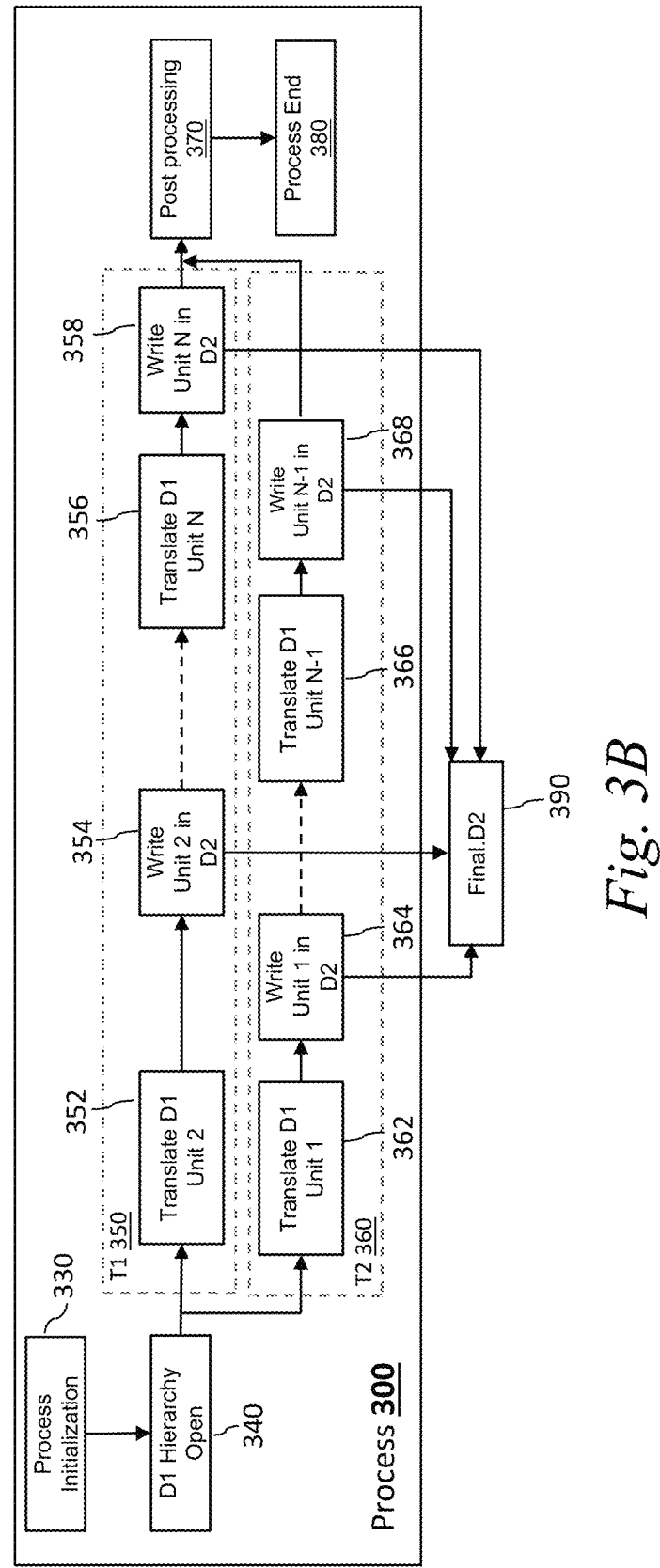
FIG. 3B is a block diagram showing a multi-threading scheme of generating a design data file in an EDA system, according to some embodiments.
Figure 6:
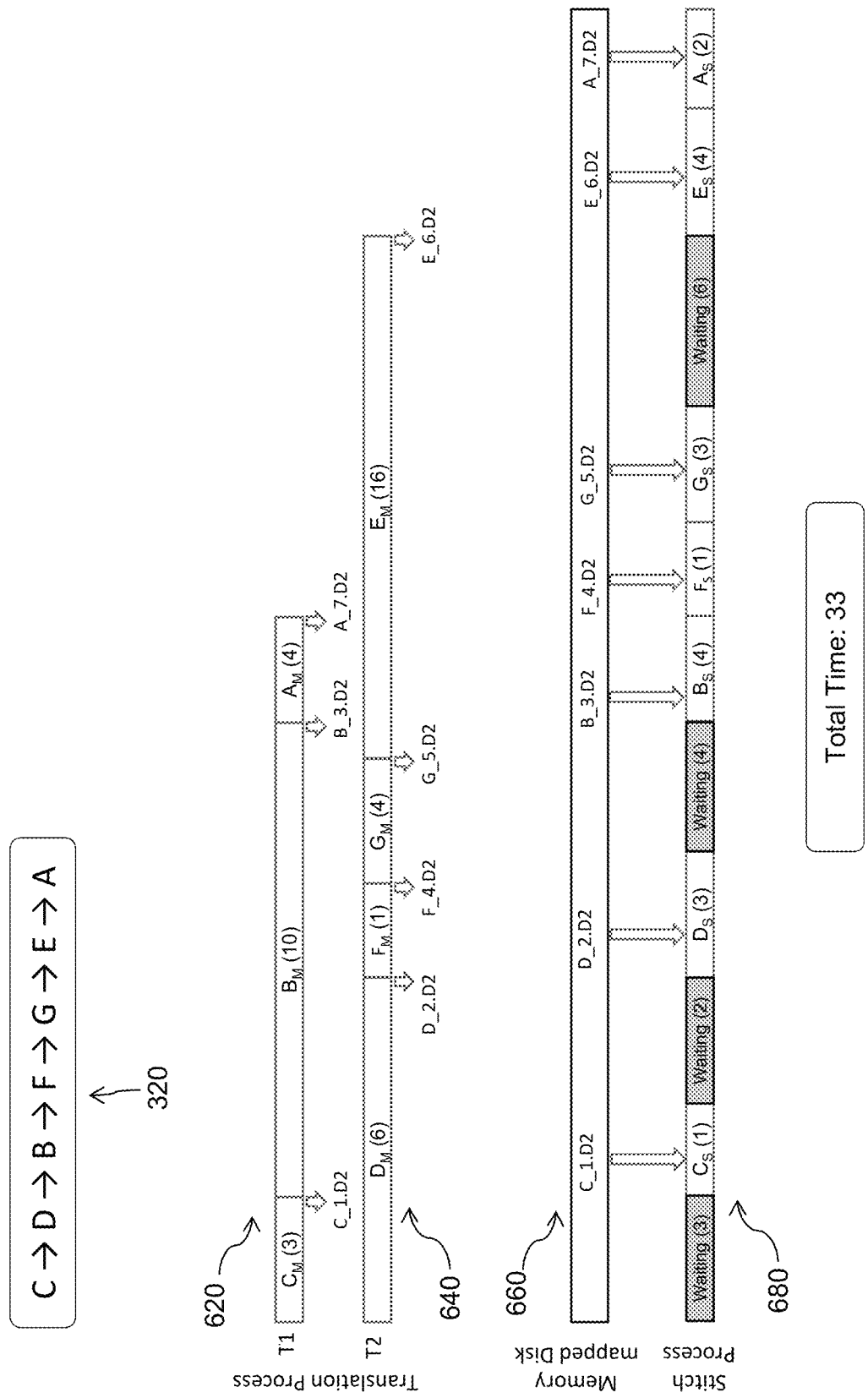
FIG. 6 is a diagram showing timing information for executing the multi-threading scheme of FIG. 5 using the hierarchical data of FIG. 4A, according to some embodiments.

FIG. 3B is a block diagram showing a multi-threading scheme of generating a design data file in an EDA system, according to some embodiments. The stream-out system 132 (as shown in FIG. 1) may generate a single design data file in format D2 (e.g., Final.D2 390 in FIG. 3, data file 240 in FIG. 2) by translating or converting design data in format D1 (e.g., design data 230 in FIG. 2). The stream-out system may perform the translation by executing a single process 300 which includes multiple threads, for example, T1 (350) and T2 (360). The process 300 may perform a process initialization 330 by initializing registers, process stack, and/or thread initialization which may include acquisition of a stack and status for each thread. The process 300 may obtain design data in format D1 from a local disk or by accessing a database (e.g., database system 106 in FIG. 1 and FIG. 2) and then open a full hierarchy of the design data in format D1 (340). In case the database (e.g., OpenAccess database) is not thread-safe, the process 300 may need to open a hierarchy of design data in a single thread as shown in FIG. 3. Then, the process 300 may determine a particular order of design objects or design units in the hierarchy (e.g., the order 320 (C→D→B→F→G→E→A) determined in FIG. 3A). The process 300 may then spawn a given number of threads. Then, multiple threads may translate a plurality of design units (e.g., units 1, . . . , N) by performing (1) an object/unit translation task of translating each unit in format D1 into format D2 and then (2) an on-disk writing task of writing the translated unit in format D2 into a single file in format D2 (e.g., Final.D2 390 in FIG. 3) on a disk (e.g., local disk of the EDA system 100 in FIG. 1) in a determined order of the design units. Each thread may pick the next available design unit to translate. Alternatively, assuming the number of threads is two, the two threads may process the design units one after another. For example, assuming the determined order of the design units is determined to be (Unit 1→Unit 2→Unit 3→ . . . >Unit (N−1)→Unit N), the thread T1 (350) may perform object/unit translation tasks (352, 356) and on-disk writing tasks (354, 358) on design units 2, . . . , N such that the translated units are sequentially stored on the single file in the determined order of the design units. Similarly, the thread T2 (360) may perform object/unit translation tasks (362, 366) and on-disk writing tasks (364, 368) on design units 1, . . . , N−1 such that the translated units are sequentially stored on the single file in the determined order of the design units. In some embodiments, since multiple threads are executing in parallel and the time required to complete the translation task of design units could vary, the assignments of design units to different threads are not pre-defined. Design units may be assigned to different threads dynamically as soon as translation of already assigned design unit is completed. If there are two threads T1 and T2, the order of all the design units (A, B, C, D, E, F, G) may be predefined as C→D→B→F→G→E→A (the order 320 in FIG. 3A) but each design unit may be assigned to either thread dynamically depending on completion time of translation of already assigned design unit. For example, as shown in FIG. 6, based on (1) the pre-defined order of all the design units and (2) completion time of translation of already assigned design unit, design units C, B, A are dynamically assigned to the thread T1 in this order, and design units D, F, G, E are dynamically assigned to the thread T2. Threads T1 and T2 are not necessarily assigned in a predefined manner (e.g., odd numbered design units to T1 and even numbered design units to T2).

After completion of all the object/unit translation tasks and on-disk writing tasks, the process 300 may perform post processing 370 by processing all the collected statistics and/or results related to the performed tasks in single threaded mode. Then, the process 300 may complete (380).

Figure 4A:
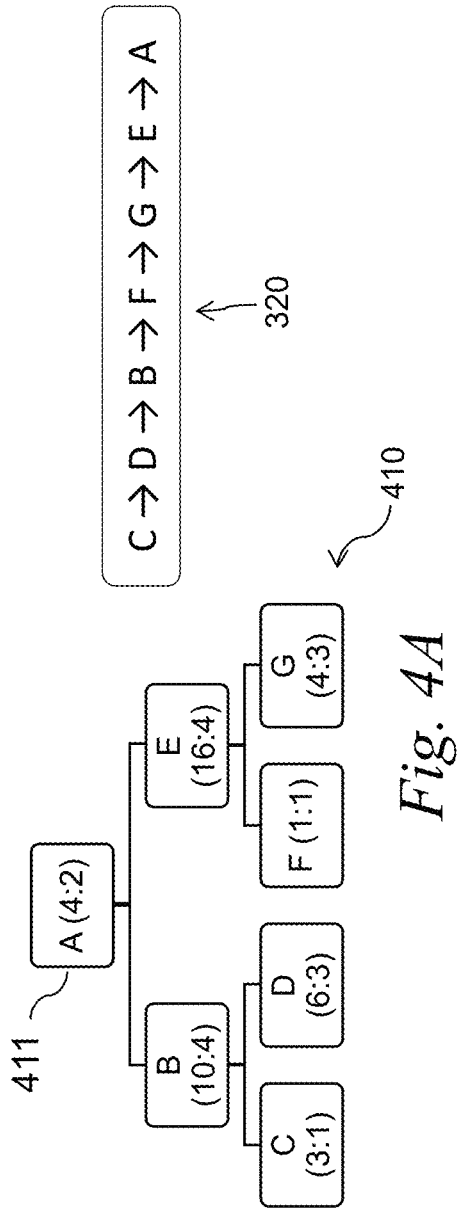
FIG. 4A is a block diagram showing hierarchical data.

FIG. 4A is a block diagram showing example hierarchical data 410 which include the same nodes as those shown in FIG. 3A except for two numbers are indicated in the parenthesis in each node 411, which represent (1) time units required during the object/unit translation task and (2) time units required during the on-disk writing task. For example, A (4:2) indicates that 4 time units are required to perform the object/unit translation task on node A, while 2 time units are required to perform the on-disk writing task on the same node.

Figure 4B:
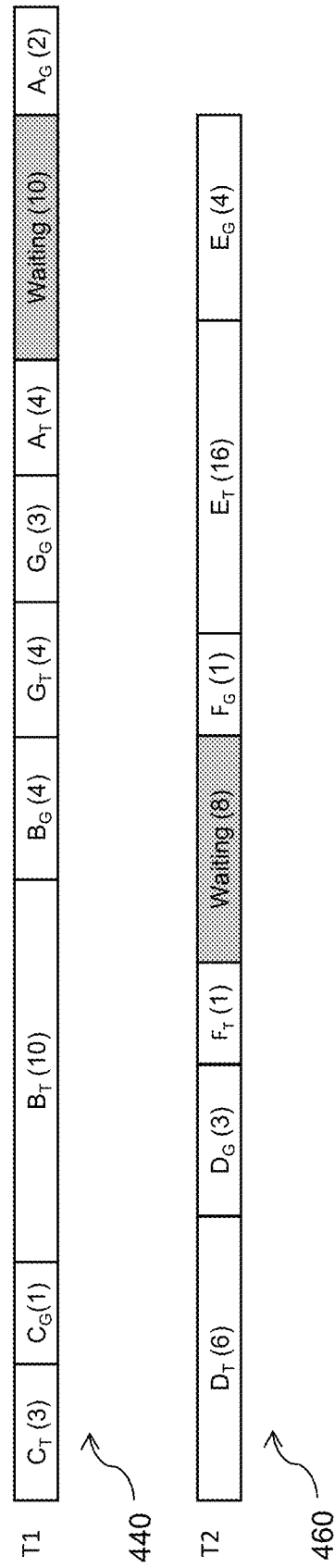
FIG. 4B is a diagram showing timing information for executing the multi-threading scheme of FIG. 3B using the hierarchical data of FIG. 4A, according to some embodiments.

FIG. 4B is a diagram showing timing information for executing the multi-threading scheme of FIG. 3B using the hierarchical data of FIG. 4A. Here, for a node X, $X_T$ (m) denotes an object/unit translation task on node X which takes m time units, and $X_G$ (n) denotes an on-disk writing task on node X which takes n time units. According to the multi-threading scheme of FIG. 3B, $X_T$ can be run independent of other nodes, but a thread must wait to run XGuntil it is in order (according to a determined order). For example, assuming the determined order is the order 320 (C→D→B→F→G→E→A) and the number of used threads is two, as shown in FIG. 4B, after executing $A_T$ (4), the thread T1 must wait for 10 time units (waiting during execution of $E_T$ (16) and $E_G$ (4)) until it executes $A_G$ (2). Similarly, after executing $F_T$ (1), the thread T2 must wait for 8 time units (waiting during execution of $B_T$ (10) and $B_G$ (4)) until it executes $F_G$ (1). In this manner, the total time taken to generate the single file in D2 format using the multi-threading scheme of FIG. 3B is 41.

FIG. 4B shows the following limitations of the multi-threading scheme of FIG. 3B. Theoretically, there is a gain using multi-threaded processing (e.g., 2 threads) compared to sequential processing with a single thread (41 time units vs 62 time units in the example here). However, the multi-threading scheme of FIG. 3B does not scale well with the number of threads. For example, the same multi-threading scheme with 3 threads requires 37 time units in the example here. Furthermore, memory consumption will increase due to sequential access to the D2 file, and to make matters worse, increased memory usage will contributes to more runtime. Moreover, file handle of the D2 file needs to be switched between threads, forcing the operating system to synchronize the pending file buffer(s) before switching between threads, thereby causing more waiting than anticipated. These considerations limit the performance improvement delivered by the multi-threading scheme of FIG. 3B. Although it achieves a performance gain compared to a single thread scheme, there is a need for a multi-threading mechanism that not only improves the performance but also is scalable with the number of threads.

In the embodiments illustrated in FIG. 3A to FIG. 4B, multi-threading can improve CPU utilization in streaming out design database changes. Because I/O hardware and I/O operations are common bottlenecks for effective multi-threading, an EDA system may use respective memory buffers in individual threads. However, introduction of multiple buffers would lead to a virtual memory explosion. Sharing of buffers would address the virtual memory concerns but would increases wait-time. Managing a common file handle across multiple threads introduces additional OS-level overhead. There is a need for a multi-threading mechanism to improve performance of streaming out design database changes in both I/O and CPU utilizations.

Moreover, in the embodiments illustrated in FIG. 3A to FIG. 4B, when units are translated in each thread, object/unit translation tasks and on-disk writing tasks may completely interleaved. In some cases, several I/O operations may be performed during object/unit translation tasks. As noted above, in some cases, the translated file in D2 format (e.g., Final.D2 390 in FIG. 3) must have a deterministic order (for example, if D2 format is GDS format), and writing the translated file to disk must be sequential. This sequential writing requirement makes it difficult to exercise multi-threading in the design data translation because the design object translation task, if performed in multiple threads, would be forced to wait to perform small interleaved I/O operations which can only be executed in a sequential fashion.

Figure 5:
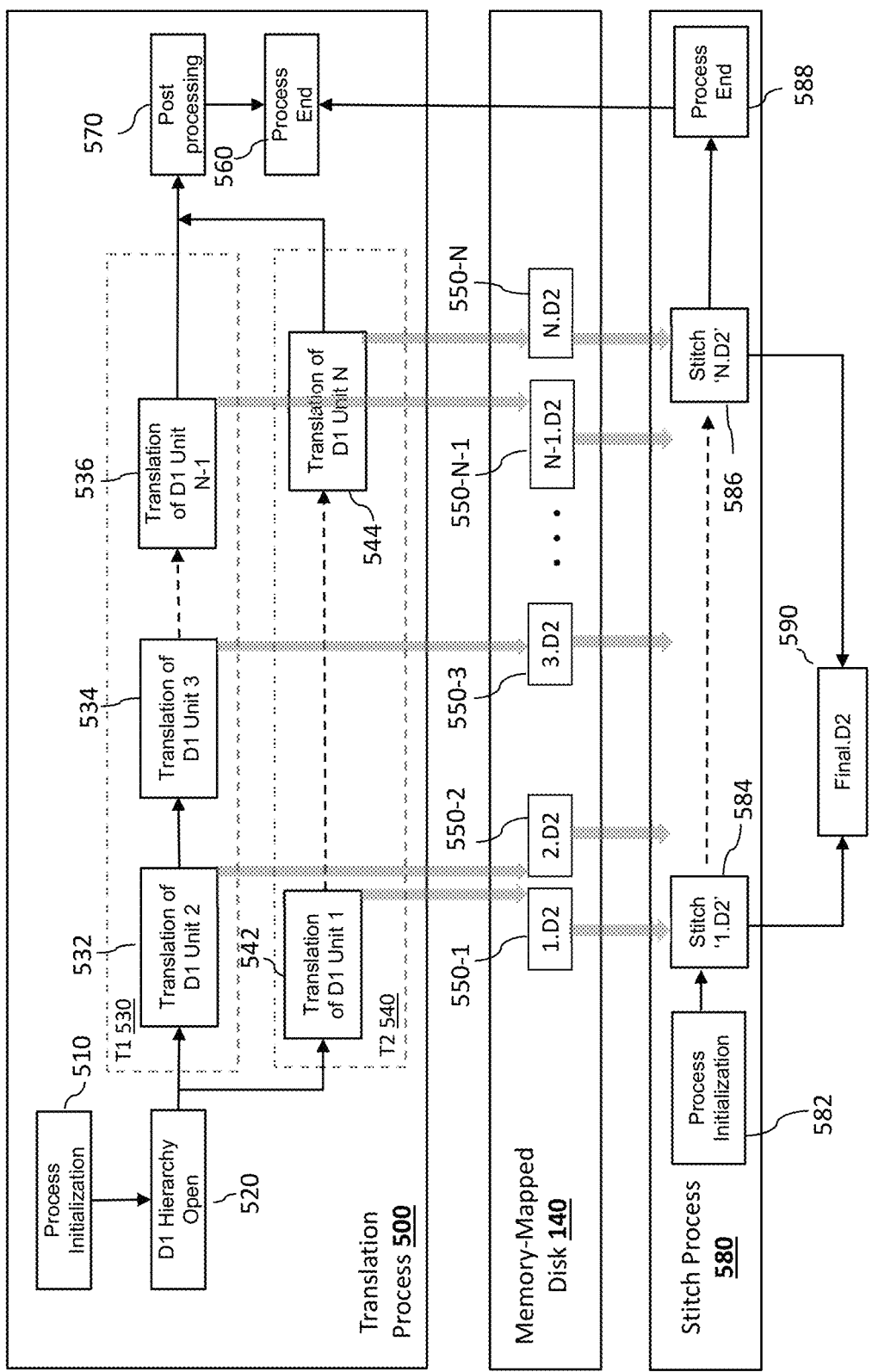
FIG. 5 is a block diagram showing a multi-threading scheme of generating a design data file in an EDA system, according to some embodiments.

To address these challenges, in some embodiments as illustrated in FIG. 5 and FIG. 6, the file in D2 format may be replaced by individual memory buffers in the design data translation process, thus separating the object/unit translation task from the on-disk writing task. With this change, the object/unit translation task can translate design units into D2 format and generate data in D2 format in memory buffer, so that the object/unit translation task consumes the memory buffer and writes the buffer to the disk during the on-disk writing task. This approach can help to separate CPU intensive tasks (e.g., object/unit translation task) and I/O intensive tasks (e.g., the on-disk writing task), improving both I/O and CPU utilizations.

FIG. 5 is a block diagram showing a multi-threading scheme of generating a design data file in an EDA system, according to some embodiments.

Referring to FIG. 5, the stream-out system 132 (see FIG. 1) may generate a single design data file in format D2 (e.g., Final.D2 590 in FIG. 5) by translating or converting design data in format D1 into format D2. The stream-out system may perform the translation by executing a process 500 (as translation process) which includes multiple threads, for example, T1 (530) and T2 (540). The process 500 may perform a process initialization 510, open a design hierarchy in D1 format (520), and determine a particular order of design objects/units, in a manner similar to the process 300 illustrated in FIG. 3B. The process 500 may then spawn a given number of threads which translate a plurality of design units (e.g., units 1, . . . , N) by performing an object/unit translation task of (1) translating each design unit (e.g., Unit 1) in format D1 into format D2, and then (2) writing the translated unit into a corresponding file fragment (e.g., 550-1, 550-2, . . . , 550-N in FIG. 5) in a memory-mapped disk (e.g., a memory-mapped disk 140 in FIG. 1). Each thread may pick the next available design unit to translate. Alternatively, each thread may pick the next design unit in an order consistent with the particular order of design objects/units previously determined by the process 500.

The stream-out system may create a child process 580 (as stitch process) and execute the stitch process 580 in parallel to the process 500 so that after performing a process initialization 582, the stitch process 580 may perform (3) a stitching task of stitching, aggregating, combining or assembling the file fragments stored in the memory-mapped disk in the determined order of the design units. Once a file fragment is available in a memory-mapped disk, then the stitch process 580 may pick or arrange file fragments in the order of a sequencing coded in their names (for example, 1.D2, 2.D2, . . . , N.D2) and to stitch (or aggregate, combine, assemble) the file fragments into a final stream file (e.g., "Final.D2" 590). A file fragment may be deleted once it is stitched into the final stream file. For example, assuming the determined order of the design units is determined to be (Unit 1→Unit 2→Unit 3→ . . . >Unit (N−1)→Unit (N−1)), the thread T1 (530) may perform object/unit translation tasks (532, 534, 536) on design units 2, 3, . . . , N−1, while the thread T2 (540) may perform object/unit translation tasks (542, 544) on design units 1, . . . , N. Simultaneously or in parallel with the threads 530 and 540, the stitch process 580 may perform the stitching tasks (582, 584, 586) on the file fragments stored in the memory-mapped disk 140 in the determined order of the design units (Unit 1→Unit 2→Unit 3→ . . . >Unit (N−1)→Unit (N−1)), generating the single design data file "Final.D2" 590. After completing all the stitching tasks, the process 580 may complete (588). On completion of all the object/unit translation tasks by the threads 530 and 540, the process 500 may perform post processing 570 in a manner similar to the post processing 370 in FIG. 3B. In some cases, the stitch process 580 can execute stitching tasks in parallel to the post-processing 570 of the process 500. On completion of the process 580, the process 500 may complete (560).

Referring to FIG. 5, the (temporary stream) file fragments 550-1, 550-2, . . . , 550-N may be created or generated in a memory-mapped disk, or a RAM disk, so that temporary I/O operations on the file fragment can be performed with memory-access characteristics, thereby improving I/O performance. In this manner, the threads do not have to wait for accessing a single stream file and can continuously translate the next available design object or unit without any wait. The file fragments may have a sequence coded in their names or an incrementing number included in the file names (e.g., 1.D2, 2.D2, . . . , N.D2), which defines a deterministic order required in the final stream file (e.g., Final.D2 590). During translation, the file fragments may be named with a predefined suffix to identify that they are still being translated. For example, assuming the name of stream file format is "D2", the names of the file fragments may be "1.D2.part", "2.D2.part", . . . , etc., thereby preventing downstream processing from consuming a stream file fragment which is still being written. Once the design data translation completes, the file fragment may be renamed to a numbered stream file name, for example, "1.D2", "2.D2", . . . , etc.

As shown in FIG. 5, the stream-out system may use a separate process (stitch process 580) that stitches these separate file fragments into a single file (e.g., Final.D2 590) at a target location (e.g., a local disk in the EDA system). In this manner, the EDA system may (1) completely detach the design data translation task, which is CPU intensive, and the on-disk stream file writing task, which is I/O intensive, (2) execute both tasks in parallel across different processes, and (3) avoid a file handle related OS-level overhead.

FIG. 6 is a diagram showing timing information for executing the multi-threading scheme of FIG. 5 using the hierarchical data of FIG. 4A. Here, for a node X, $X_M$ (m) denotes an object/unit translation task executed by the translation process 500 on node X which takes m time units, and $X_S$ (n) denotes a stitching task executed by the stitch process 580 on node X which takes n time units. According to the multi-threading scheme of FIG. 5, a thread of the process 500 does not have to wait to run $X_M$ because it writes a translated unit to a memory-mapped disk instead of wiring to a (non-memory-mapped) disk. See timing information 620 and 640 in FIG. 6. The stitch process 580, however, must wait to run $X_S$ until it is in order (according to a determined order). For example, assuming the determined order is the order 320 (C→D→B→F→G→E→A) and the number of used threads is two, as shown in timing information 660 and 680 in FIG. 6, the stitch process must wait for 3 time units to run $C_S$ (3), wait for 2 time units to run $D_S$ (3), wait for 4 time units to run $B_S$ (3), and wait for 6 time units to run $E_S$ (4). In this manner, the total time taken to generate the single file in D2 format using the multi-threading scheme of FIG. 5 is 33, achieving a strong performance gain compared to the multi-threading scheme of FIG. 3B (33 vs. 41) and compared to the single thread scheme (33 vs. 62). In the multi-threading scheme of FIG. 5, the I/O intensive stitching tasks executed by the stitch process 580 are optimized such that they can run in parallel to the object/unit translation tasks executed by the threads 530 and 540. Moreover, the multi-threading scheme of FIG. 5 achieves a good scaling with increasing number of threads. For example, with 3 threads, the scheme takes 26 time units, achieving a performance gain compared to running with 2 threads (26 vs. 33).

Figure 7:
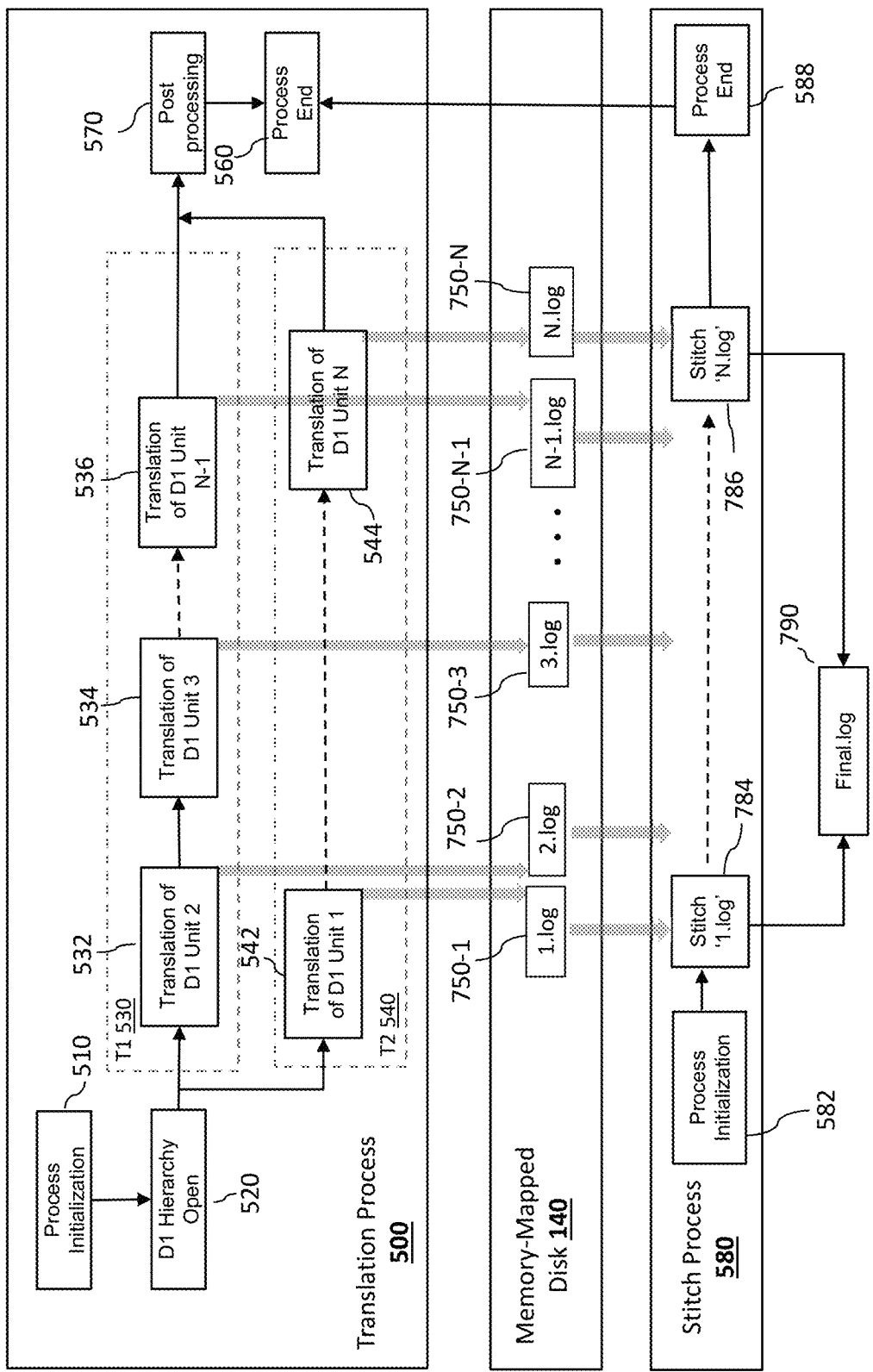
FIG. 7 is a block diagram showing a multi-threading scheme of generating a log file in an EDA system, according to some embodiments.

FIG. 7 is a block diagram showing a multi-threading scheme of generating a log file in an EDA system, according to some embodiments. In some embodiments, when a child process (e.g., stitch process 580 in FIG. 5) stitches a temporary stream file fragment of a design object or unit, the child process may also stitch a log file fragment corresponding to the temporary stream file fragment, for the design object or unit which is in the order. Then, the stitch process may look for a temporary stream file fragment and a corresponding log file fragment of the next design object. In other words, a temporary stream file fragment and a log file fragment corresponding to that temporary stream file fragment can be stitched in the same iteration. In this manner, the stitch process can work in parallel to the translation process (e.g., translation process 500 in FIG. 5) and work further in parallel to a post-processing step (e.g., post-processing 570 in FIG. 5), if stitching is still going on after translation of all the design objects or units. Additional optional operations can be performed in the post-processing step of the translation process without any impact on overall runtime. This multi-threading scheme of generating both the design data file and the log file will be described with reference to FIG. 7.

Referring to FIG. 5 and FIG. 7, the stream-out system 132 (see FIG. 1) may generate a single log file (e.g., Final.log 790) by writing (or storing) log data pieces (e.g., log data pieces corresponding to D1 units 1, 2, . . . , N) in a memory-mapped disk (e.g., a memory-mapped disk 140) and stitching (or aggregating, combining, assembling) the log data pieces stored in the memory-mapped disk. The log data pieces may contain any information (e.g., warning messages) generated during translation of design objects or units. The stream-out system may perform the log writing (to a memory-mapped disk) by executing the translation process 500 (as a process of performing both design object translation and log writing) which includes multiple threads, for example, T1 (530) and T2 (540). The threads (e.g., T1 and T2 in FIG. 7) may not only perform a task of writing each translated design object/unit into a corresponding stream file fragment (e.g., 550-1, 550-2, . . . , 550-N in FIG. 5) in a memory-mapped disk (e.g., a memory-mapped disk 140 in FIG. 1), but also perform a task of writing a log data piece corresponding to each design object/unit into a corresponding log file fragment (e.g., 750-1, 750-2, . . . , 750-N in FIG. 7) in the memory-mapped disk. In other words, the translation process can produce two temporary file fragments in the memory-mapped disk for each design object-(1) stream file fragment and (2) log file fragment.

Referring to FIGS. 5 and 7, the stich process 580 may not only perform a task of stitching the temporary stream file fragments (e.g., 550-1, 550-2, . . . , 550-N) but also perform a log stitching task of stitching (or aggregating, combining, assembling) log file fragments (e.g., 750-1, 750-2, . . . , 750-N) stored in the memory-mapped disk in the determined order of the data log pieces (which is the same order of the plurality of design objects/units determined by the stream-out system 132 (as shown in FIG. 1)). Once a log file fragment is available in a memory disk, then the stitch process 580 may pick or arrange log file fragments in the order of a sequencing coded in their names (for example, 1.log, 2.log, . . . , N.log) and to stitch (or aggregate, combine, assemble) the log file fragments into a final log file (e.g., "Final.log" 790). A log file fragment may be deleted once it is stitched into the final log file. Simultaneously or in parallel with the threads 530 and 540, the stitch process 580 may perform the log stitching tasks (e.g., 784, 786) on the log file fragments stored in the memory disk 140 in the determined order of the log data pieces, generating the single log file "Final.log" 790. After completing all the log stitching tasks, the stitch process 580 may be completed (e.g., process end 588).

As shown in FIG. 7, the stitch process 580 can handle a log file (using temporary log file fragments 750-1, 750-2, . . . , 750-N) in a manner similar to processing of the stream file as shown in FIG. 6 to ensure a deterministic order of log data pieces in the log file. The temporary log file fragments may also be used to communicate any error between the translation process 500 and the stitch process 580, thereby helping to terminate the stitch process 580 at an appropriate time and clean the rest of the temporary stream file fragments (e.g., 1.D2, . . . , N.D2) and log files fragments (e.g., 1.log, 2.log, . . . , N.log) in case of any error.

Referring to FIGS. 5 and 7, an EDA system (e.g., EDA system 100 or host system 102 in FIG. 1) may create a translation process 500 so that the translation process executes a thread 530, 540 for (1) translating each design object or unit in design data (e.g., each Cellviews in OpenAccess hierarchical data) and/or (2) writing a log piece corresponding to each design object or unit, in a multi-threaded fashion. Each thread may generate a separate temporary stream file fragment (e.g., 550-1, 550-2, . . . , 550-N in GDS file format) and/or a separate log file fragment (e.g., 750-1, 750-2, ..., 750-N in FIG. 7) for the corresponding design object or unit, in a memory disk. The temporary stream file fragments may have increasing numbers in their names (e.g., 1.D2, 2.D2, ..., N.D2) to encode a specific order. Similarly, the log file fragments may have increasing numbers in their names (e.g., 1.log, 2.log, ..., N.log) to encode a specific order. The EDA system may create a stitch process 580 so that in parallel with the translation process, the stitch process 500 can stitch the temporary stream file fragments (e.g., 550-1, 550-2, ..., 550-N) in the defined specific order and generate a single stream file (e.g., Final.D2 590 in GDS format) on a target location, and/or stitch the temporary log file fragments (e.g., 750-1, 750-2, ..., 750-N) in the defined specific order and generate a single log file (e.g., Final.log 790) on a target location. The stitch process may execute an on-disk stream file writing task for all the object or unit in the design data (e.g., all Cellviews in OpenAccess data). The stitch process may also stitch available temporary log file fragments in the same order as encoded in their names (e.g., 1.log, 2.log, ..., N.log), and generate a single log file (e.g., Final.log 790). The stitch process may delete a temporary stream file fragment once it is stitched into the single stream file. Similarly, the stitch process may delete a log file fragment once it is stitched into the single log file.

FIGS. 8A and 8B show results of performance comparison between different thread-based schemes of generating a design data file in an EDA system. FIG. 8A shows a table 800 including benchmark information on three customer benchmark designs (C1, C2, C3) used for performance comparison between different multi-threading schemes. The benchmark information includes OpenAccess (OA) data size, number of cells in the OA data, GDS data size, and number of shapes in the GDS data. FIG. 8B shows a table 800 including performance results between a single thread scheme, a two-thread scheme (as shown in FIG. 5), a four-thread scheme, and an eight-thread scheme, with respect to a run time performance (in seconds) and a peak amount of virtual memory (VM) (in GB). The compared schemes are implemented using XStream-Out APIs or executables to translate OA hierarchical data into a single GDS file. More particularly, FIG. 8B shows that run time performance can be improved up to 4.5 times across schemes with different number of threads and that the VM peak amount of multi-thread schemes is almost the same as the single-thread scheme and does not increase with number of threads.

FIGS. 9A and 9B show results of performance comparison between (1) runtimes of different thread-based schemes of generating a design data file in an EDA system and (2) optimal lower bound run times. A lower bound run time is the most optimal time that can be achieved. The compared schemes are implemented using XStream-Out (which is a command-line executable) to translate OA hierarchical data into a single GDS file.

FIG. 9A shows a table 900 including (optimal) lower bound run times t1 and t3 over three customer benchmark designs (C1, C2, C3). Here, a total run time can be broken down to (1) time required to read OA hierarchical data (t1), (2) time required to translate OA objects (t2), (3) time required to write the GDS file on disk (t3), and (4) time required to post-process all collected statistics and/or results (t4). Time t1 is time required to traverse the OA hierarchy and open the OA data, which is equivalent to time required to open the design at 32 levels (e.g., dbOpenCellViewBy-Type+dbOpenHier at 32 level). Time t2 and time t3 are required for Cellview translation such that time t2 is required to translate OA objects, and time t3 is required to write the GDS file on disk. Time t3 is equivalent to copying the GDS file from a memory-mapped disk to a local disk, therefore the runtime is equivalent to that of copying files or directories (CP command). Time t4 is required to post-process all collected statistics and/or results. Here, both time t1 and time t3 are times required to perform I/O tasks and both are sequential, requiring both the tasks (for t1 and t3) to execute one after another. So the total run time cannot go below (t1+t3), which is the lower bound of the total run time.

FIG. 9B shows a table 950 including (1) the run times of various thread-based schemes over the three benchmarks and (2) optimal lower bound run times over the three benchmarks (in the right most column). It is shown that the run times of the eight-thread scheme over the three benchmarks (41.60, 47.90, 128.13) are very close to the optimal lower bound run times (36.74, 45.09, 126.24), respectively, thus achieving a near-optimal performance.

Figure 10:
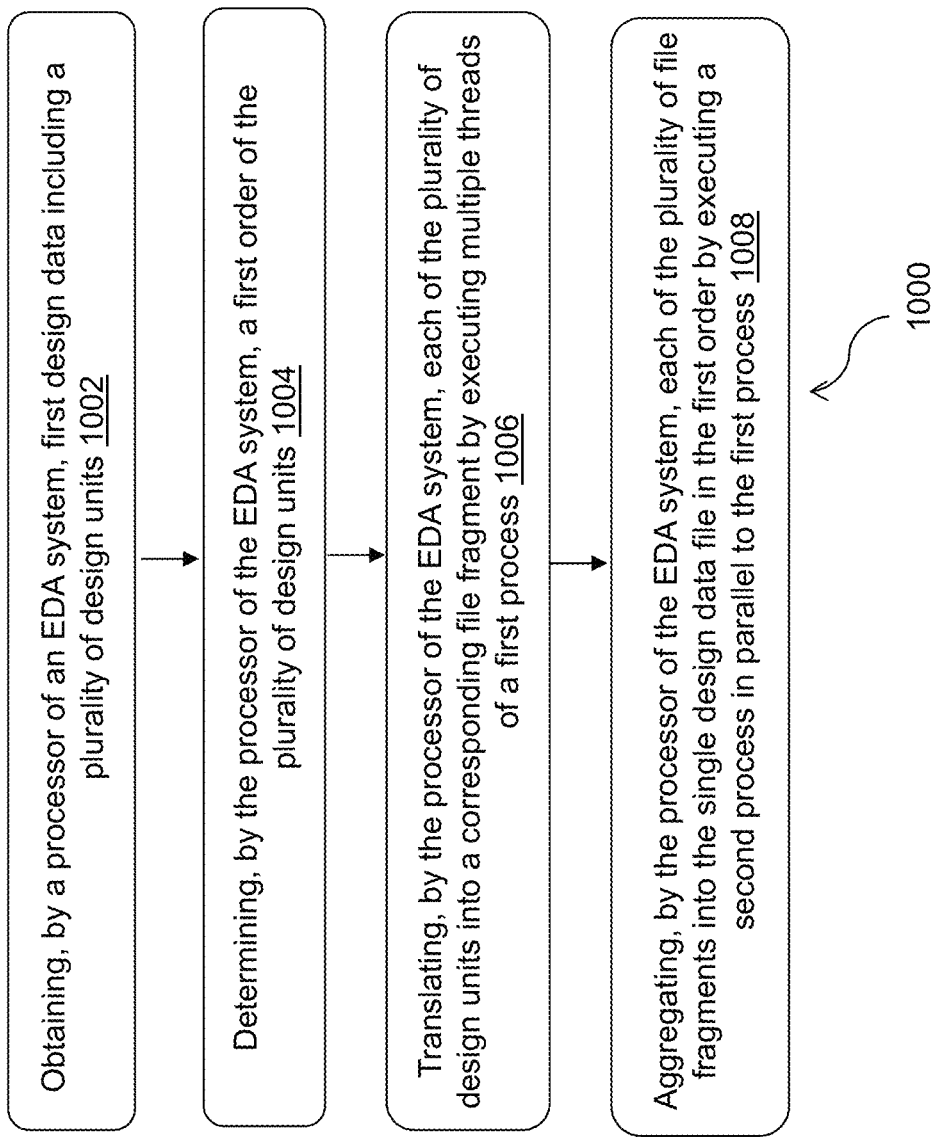
FIG. 10 is a flowchart illustrating a methodology for generating a design data file in an EDA system, according to some embodiments.

FIG. 10 shows execution steps for generating a design data file (e.g., data file in format D2 240 in FIG. 2; Final.D2 590 in FIG. 5) in an EDA system, according to a method 1000. The method 1000 may include execution steps 1002, 1004, 1006, and 1008 performed in an EDA system including a processor (e.g., EDA system 100 or host system 102 which includes processor 114 in FIG. 1). It should be understood that the steps described herein are merely illustrative and additional or substitute steps should also be considered to be within the scope of this disclosure. Furthermore, methods with a fewer numbers of steps should also be considered to be within the scope of this disclosure.

At step 1002, the processor of the EDA system may obtain design data (data in format D1 230 in FIG. 2, for example, OpenAccess data) including a plurality of design units (e.g., a plurality of Cellviews in OpenAccess data). The design data may have a hierarchical data format (e.g., OpenAccess data is hierarchical at different levels), and the design file may have a binary data format (e.g., GDS stream file format). The single design file (e.g., GDS format) may have a data format different from a data format of the design data (e.g., OpenAccess format).

At step 1004, the processor of the EDA system may determine a first order of the plurality of design units (e.g., order 320 of (C→D→B→F→G→E→A) in FIG. 3A; order (Unit 1→Unit 2→Unit 3→ ... >Unit (N−1)→Unit (N−1)) in FIG. 5). The design data may represent a hierarchy of the plurality of design units (e.g., a plurality of Cellviews at different levels). The first order of the plurality of design units may be determined based on the hierarchy of the plurality of design units (e.g., hierarchy 310 in FIG. 3A). The first order of the plurality of design units may be determined based on a post-order traversal of the hierarchy of the plurality of design units (e.g., order 320 (C→D→B→F→G→E→A) is determined based on a post-order traversal of the hierarchy 310).

At step 1006, the processor of the EDA system may translate each of the plurality of design units (e.g., Unit 1, .... Unit N in FIG. 5) into a corresponding file fragment (e.g., file fragments 550-1, ..., 550-N in FIG. 5) by executing multiple threads (e.g., threads 530 and 540) of a first process (e.g., translation process 500 in FIG. 5).

In translating each design unit, the processor may be configured to store the corresponding file fragment (e.g., file fragments 550-1, ..., 550-N in FIG. 5) in a memory-mapped disk (e.g., memory disk 140 in FIG. 5). In translating each design unit, the processor may be configured to execute a first thread (thread 530 in FIG. 5) of the multiple threads that translates a first portion of the plurality of design units (e.g., Unit 2, Unit 3, . . . , Unit N−1 in FIG. 5) into corresponding file fragments (e.g., 550-2, 550-3, . . . , 550-N−1 in FIG. 5) in an order consistent with the first order (e.g., the determined order of (Unit 1→Unit 2→ Unit 3→ . . . >Unit (N−1)→Unit (N−1) in FIG. 5). The processor may be configured to execute, in parallel to the first thread, a second thread (e.g., thread 540 in FIG. 5) of the multiple threads that translates a second portion of the plurality of design units (e.g., Unit 1, . . . , Unit N in FIG. 5) into corresponding file fragments (e.g., 550-1, . . . , 550-N in FIG. 5) in an order consistent with the first order.

At step 1008, the processor of the EDA system may aggregate each of the plurality of file fragments (e.g., 550-1, 550-2, . . . , 550-N in FIG. 5) into the single design data file (e.g., Final.D2 590 in FIG. 5) in the first order (e.g., the determined order of (Unit 1→Unit 2→Unit 3→ . . . >Unit (N−1)→Unit (N−1) in FIG. 5) by executing a second process (e.g., stitch process 580 in FIG. 5) in parallel to the first process (e.g., translation process 500 in FIG. 5).

In aggregating each file fragment, the processor may be configured to read a corresponding file fragment from the memory-mapped disk (e.g., a memory-mapped disk 140 in FIG. 5). In aggregating each file fragment, the processor may be configured to determine that the entirety of the plurality of file fragments have been aggregated into the single design data file in the first order. In response to the determining, the processor may be configured to store the single design data file in a disk which is not a memory-mapped disk or a RAM disk. In aggregating each file fragment, the processor may be configured to determine that a particular file fragment has been aggregated into the single data file (e.g., Final.D2 590 in FIG. 5). In response to the determining, the processor may be configured to delete the particular file fragment from the disk by executing the second process (e.g., stitch process 580 in FIG. 5).

The processor may be further configured to obtain a plurality of log data pieces corresponding to the plurality of the plurality of design units (e.g., D1 Unit 1, D1 Unit 2, . . . , D1 Unit N in FIG. 7), store each of the plurality of log data pieces into a corresponding log file fragment (e.g., 750-1, 750-2, . . . , 750-N) in a memory-mapped disk (e.g., a memory-mapped disk 140 in FIG. 7) by executing multiple threads (e.g., threads 530, 540 in FIG. 7) of the first process (e.g., translation process 500 in FIG. 5 and FIG. 7), and aggregate each of the plurality of log file fragments (e.g., 750-1, 750-2, . . . , 750-N) into a single log file (e.g., Final.log 790 in FIG. 7) in the first order by executing the second process (e.g., stitch process 580 in FIG. 5 and FIG. 7) in parallel to the first process.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may include RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of generating a design data file, comprising:
    obtaining, by a computer, design data including a plurality of design units;
    determining, by the computer, a first order of the plurality of design units;
    translating, by the computer, each of the plurality of design units into a corresponding file fragment by executing multiple threads of a first process;
    aggregating, by the computer, each of the plurality of file fragments into a design data file in the first order by executing a second process in parallel to the first process; and
    storing, by the computer, the design data file into a non-transitory machine-readable memory configured to store a plurality of design data files, in response to the computer determining that each file fragment for an entirety of the plurality of file fragments has been aggregated into the design data file in the first order.

2. The method according to claim 1, wherein:
    translating, by the computer, each design unit includes storing the corresponding file fragment in a memory-mapped disk, and
    aggregating, by the computer, each file fragment includes reading the corresponding file fragment from the memory-mapped disk.

3. The method according to claim 2, wherein aggregating each file fragment includes:
    determining, by the computer, that a particular file fragment has been aggregated into the design data file; and
    in response to the determining, deleting, by the computer, the particular file fragment from the memory-mapped disk by executing the second process.

4. The method according to claim 1, wherein the design data file has a first data format different from a second data format of the design data.

5. The method according to claim 1, wherein the design data has a hierarchical data format and the design data file has a binary data format.

6. The method according to claim 1, wherein translating each design unit includes:
    executing, by the computer, a first thread of the multiple threads that translates a first portion of the plurality of design units into corresponding file fragments in an order consistent with the first order; and
    executing, by the computer, in parallel to the first thread, a second thread of the multiple threads that translates a second portion of the plurality of design units into corresponding file fragments in the order consistent with the first order.

7. The method according to claim 1, wherein aggregating each file fragment includes:
    determining, by the computer, that the entirety of the plurality of file fragments have been aggregated into the design data file in the first order.

8. A system for generating a design data file, the system comprising:
    a memory comprising non-transitory machine-readable storage; and
    a processor configured to:
        obtain design data including a plurality of design units;
        determine a first order of the plurality of design units;
        translate each of the plurality of design units into a corresponding file fragment by executing multiple threads of a first process;
        store each file fragment into the memory;
        aggregate each of the plurality of file fragments into a design data file in the first order by executing a second process in parallel to the first process; and
        store the design data file into a second non-transitory machine-readable memory configured to store a plurality of design data files, in response to the computer determining that each file fragment for an entirety of the plurality of file fragments has been aggregated into the design data file in the first order.

9. The system according to claim 8, wherein the memory comprises a memory-mapped disk;
    wherein in translating each design unit, the processor is configured to store the corresponding file fragment into the memory-mapped disk; and
    wherein in aggregating each file fragment, the processor is configured to read the corresponding file fragment from the memory-mapped disk.

10. The system according to claim 9, wherein in aggregating each file fragment, the processor is configured to:
    determine that a particular file fragment has been aggregated into the design data file; and in response to the determining, delete the particular file fragment from the memory-mapped disk by executing the second process.

11. The system according to claim 8, wherein the design data file has a first data format different from a second data format of the design data.

12. The system according to claim 8, wherein the design data has a hierarchical data format, and wherein the design data file has a binary data format.

13. The system according to claim 8, wherein in translating each design unit, the processor is configured to:
    execute a first thread of the multiple threads that translates a first portion of the plurality of design units into corresponding file fragments in an order consistent with the first order; and
    execute, in parallel to the first thread, a second thread of the multiple threads that translates a second portion of the plurality of design units into corresponding file fragments in the order consistent with the first order.

14. The system according to claim 8, further comprising a second memory comprising the second non-transitory machine-readable storage configured to store the plurality of design data files, and wherein in aggregating each file fragment, the processor is configured to:
    determine that the entirety of the plurality of file fragments have been aggregated into the design data file in the first order.

15. A non-transitory computer readable medium storing program instructions configured to be executed by one or more processors to:

obtain design data including a plurality of design units;
determine a first order of the plurality of design units;
translate each of the plurality of design units into a corresponding file fragment by executing multiple threads of a first process;
aggregate each of the plurality of file fragments into a design data file in the first order by executing a second process in parallel to the first process; and
store the design data file into a non-transitory machine-readable memory configured to store a plurality of design data files, in response to the computer determining that each file fragment for an entirety of the plurality of file fragments has been aggregated into the design data file in the first order.

16. The non-transitory computer readable medium according to claim 15, wherein the program instructions are further configured to be executed by the one or more processors to:

translate each design unit includes storing the corresponding file fragment in a memory-mapped disk, and
aggregate each file fragment includes reading the corresponding file fragment from the memory-mapped disk.

17. The non-transitory computer readable medium according to claim 16, wherein in aggregating each file fragment, wherein the program instructions are further configured to be executed by the one or more processors to:

determine that a particular file fragment has been aggregated into the design data file; and
in response to the determining, delete the particular file fragment from the memory-mapped disk by executing the second process.

18. The non-transitory computer readable medium according to claim 15, wherein the design data has a hierarchical data format and the design data file has a binary data format.

19. The non-transitory computer readable medium according to claim 15, wherein in translating each design unit, wherein the program instructions are further configured to be executed by the one or more processors to:

execute a first thread of the multiple threads that translates a first portion of the plurality of design units into corresponding file fragments in an order consistent with the first order; and
execute, in parallel to the first thread, a second thread of the multiple threads that translates a second portion of the plurality of design units into corresponding file fragments in the order consistent with the first order.

20. The non-transitory computer readable medium according to claim 15, wherein in aggregating each file fragment, wherein the program instructions are further configured to be executed by the one or more processors to:

determine that the entirety of the plurality of file fragments have been aggregated into the design data file in the first order.

\* \* \* \* \*

UNITED STATES PATENT AND TRADEMARK OFFICE
CERTIFICATE OF CORRECTION

PATENT NO. : 12,182,613 B1
APPLICATION NO. : 17/245506
DATED : December 31, 2024
INVENTOR(S) : Sunil Prasad Todi, Amit Khurana and Chandra Prakash Manglani It is certified that error appears in the above-identified patent and that said Letters Patent is hereby corrected as shown below:

On the Title Page

Item (12), should read:
Todi et al.

Item (72) Inventors:, please change the order of the inventors to read:
Sunil Prasad Todi, Uttar Pradesh (IN); Amit Khurana, Uttar Pradesh (IN); Chandra Prakash Manglani, Uttar Pradesh (IN)

Signed and Sealed this
Fifth Day of August, 2025

Coke Morgan Stewart
*Acting Director of the United States Patent and Trademark Office*